US007587328B2

(12) United States Patent
Kawahara et al.

(10) Patent No.: US 7,587,328 B2
(45) Date of Patent: Sep. 8, 2009

(54) TRANSACTION ADJUSTING DEVICE

(75) Inventors: Hiroshi Kawahara, Tokyo (JP); Takuya Sato, Kanagawa (JP); Daisuke Kobayashi, Osaka (JP); Jingo Takemura, Osaka (JP); Yuji Yamamoto, Osaka (JP); Norio Iwai, Tokyo (JP)

(73) Assignee: LNG JAPAN Corporation, Minato-ku, Tokyo (JP)

( * ) Notice: Subject to any disclaimer, the term of this patent is extended or adjusted under 35 U.S.C. 154(b) by 1395 days.

(21) Appl. No.: 10/070,358

(22) PCT Filed: May 11, 2001

(86) PCT No.: PCT/JP01/03966

§ 371 (c)(1),
(2), (4) Date: Mar. 5, 2002

(87) PCT Pub. No.: WO02/05156

PCT Pub. Date: Jan. 17, 2002

(65) Prior Publication Data

US 2002/0138293 A1     Sep. 26, 2002

(30) Foreign Application Priority Data

Jul. 6, 2000     (JP)     ............................. 2000-210706

(51) Int. Cl.
    *G06F 9/46* (2006.01)
(52) U.S. Cl. .......................................................... 705/8
(58) Field of Classification Search ....................... 705/8
    See application file for complete search history.

(56) References Cited

U.S. PATENT DOCUMENTS 5,265,006 A * 11/1993 Asthana et al. ................. 705/8

| | | | | |
|---|---|---|---|---|
| 5,278,750 A | * | 1/1994 | Kaneko et al. ................. | 705/8 |
| 5,797,113 A | * | 8/1998 | Kambe et al. ................ | 701/201 |
| 6,304,856 B1 | * | 10/2001 | Soga et al. ..................... | 705/28 |
| 2001/0047285 A1 | * | 11/2001 | Borders et al. .................. | 705/8 |
| 2002/0103726 A1 | * | 8/2002 | Jones et al. .................... | 705/28 |
| 2002/0147654 A1 | * | 10/2002 | Kraisser et al. ................ | 705/26 |
| 2002/0165804 A1 | * | 11/2002 | Beebe et al. ................... | 705/28 |
| 2004/0107111 A1 | * | 6/2004 | Barts et al. ..................... | 705/1 |

OTHER PUBLICATIONS

Mc Coll et al. "A Good Company Never Blames Its APS Tools." PPI, vol. 41, No. 12, pp. 37-39, Dec. 1999.*
Monk et al. "The Customer-Driven Development of Human Factors Design Guidelines." Public Roads, vol. 63, No. 4, p. 2, Jan. 2000.*

* cited by examiner

*Primary Examiner*—Susanna M Diaz
(74) *Attorney, Agent, or Firm*—McGinn IP Law Group, PLLC

(57) ABSTRACT

A transaction coordinating device 100 is composed, in which a transportation adjusting portion 140 is provided for adjusting an insertion of cargo transportation of a spot transaction with respect to a schedule of single and/or plural cargo transportation of predetermined fixed transactions, in the event an insertion of a spot transaction based on a temporary contract with respect to fixed transactions based on the contracts of predetermined period of time is adjusted. Accordingly, inserting cargo transportation of a spot transaction easily into a schedule of single and/or plural cargo transportation of fixed transactions becomes possible even in the event that a spot transaction arises suddenly, and further inserting a commodity transaction under a flexible contract into commodity transactions under rigid contract simply also becomes possible.

21 Claims, 9 Drawing Sheets

EXISTING SCHEDULE

| SHIPPING PORT (X) | | | | | | | NUMBER OF DAYS OF NAVIGATION | UNLOADING PORT (Y) | PURCHASER |
|---|---|---|---|---|---|---|---|---|---|
| a | b | c | d | e | f | g | | | |
| | | | 9/6 | | | | 17 | 9/12 | A |
| | | | | | 9/8 | | 17 | 9/14 | B |
| | | | | 9/11 | | | 18 | 9/17 | C |
| | | | | | | 9/11 | 17 | 9/17 | A |
| | | 9/13 | | | | | 16 | 9/19 | D |
| 9/18 | | | | | | | 19 | 9/24 | D |
| | 9/21 | | | | | | 18 | 9/27 | E |
| | | | 9/21 | | | | 15 | 9/27 | A |

FIG.6

CHANGED SCHEDULE

| SHIPPING PORT (X) | | | | | | | NUMBER OF DAYS OF NAVIGATION | UNLOADING PORT (Y) | PURCHASER | |
|---|---|---|---|---|---|---|---|---|---|---|
| a | b | c | d | e | f | g | | | | |
| | | | 9/4 | | | | 15 | 9/10 | K | ← ADDITIONAL FREIGHTER |
| | | | | | 9/6 | | 15 | 9/12 | A | |
| | | | | 9/8 | | | 15 | 9/14 | B | |
| | | | | | | 9/11 | 17 | 9/17 | C | |
| | | 9/11 | | | | | 14 | 9/17 | A | |
| 9/13 | | | | | | | 14 | 9/19 | D | |
| | 9/18 | | | | | | 15 | 9/24 | D | |
| | | | 9/21 | | | | 17 | 9/27 | E | |
| | | | | | 9/21 | | 15 | 9/27 | A | |

FIG.7

EXISTING SCHEDULE

| SHIPPING PORT (X) | | | | | | | NUMBER OF DAYS OF NAVIGATION | UNLOADING PORT (Y) | PURCHASER |
|---|---|---|---|---|---|---|---|---|---|
| a | b | c | d | e | f | g | | | |
| | | | 9/6 | | | | 17 | 9/12 | A |
| | | | | | 9/8 | | 17 | 9/14 | B |
| | | | | 9/11 | | | 18 | 9/17 | C |
| | | | | | | 9/11 | 17 | 9/17 | A |
| | | 9/13 | | | | | 14 | 9/19 | D |
| 9/18 | | | | | | | 19 | 9/24 | D |
| | 9/21 | | | | | | 18 | 9/27 | E |
| | | | 9/21 | | | | 15 | 9/27 | A |

FIG.8

CHANGED SCHEDULE

| SHIPPING PORT (X) | | | | | | | NUMBER OF DAYS OF NAVIGATION | UNLOADING PORT (Y) | PURCHASER | |
|---|---|---|---|---|---|---|---|---|---|---|
| a | b | c | d | e | f | g | | | | |
| | | | 9/4 | | | | 15 | 9/10 | K | ← ADDITIONAL FREIGHTER |
| | | | | | 9/6 | | 15 | 9/12 | A | |
| | | | | 9/8 | | | 15 | 9/14 | B | |
| | | | | | | 9/11 | 17 | 9/17 | C | |
| | | 9/13 | | | | | 14 | 9/19 | A | ← CHANGED FREIGHTER |
| 9/13 | | | | | | | 14 | 9/19 | D | |
| | | 9/18 | | | | | 15 | 9/24 | D | |
| | | | 9/21 | | | | 17 | 9/27 | E | |
| | | | | | 9/21 | | 15 | 9/27 | A | |

FIG.9

EXISTING SCHEDULE

| SHIPPING PORT (X) | | | | | | | | | | NUMBER OF DAYS OF NAVIGATION | UNLOADING PORT (Y) | PURCHASER |
|---|---|---|---|---|---|---|---|---|---|---|---|---|
| a | b | c | d | e | f | g | p | q | r | | | |
|   |   |   | 9/6 |   |   |   |   |   |   | 17 | 9/12 | A |
|   |   |   |   |   | 9/8 |   |   |   |   | 17 | 9/14 | B |
|   |   |   |   | 9/11 |   |   |   |   |   | 18 | 9/17 | C |
|   |   |   |   |   |   | 9/11 |   |   |   | 17 | 9/17 | A |
|   |   | 9/13 |   |   |   |   |   |   |   | 14 | 9/19 | D |
|   |   |   |   |   |   |   | 9/14 |   |   | 17 | 9/20 | A |
| 9/18 |   |   |   |   |   |   |   |   |   | 19 | 9/24 | D |
|   | 9/21 |   |   |   |   |   |   |   |   | 18 | 9/27 | E |
|   |   |   | 9/21 |   |   |   |   |   |   | 15 | 9/27 | A |

FIG.10

CHANGED SCHEDULE

| SHIPPING PORT (X) | | | | | | | | | | | | | | | | | | NUMBER OF DAYS OF NAVIGATION | UNLOADING PORT (Y) | PURCHASER | |
|---|---|---|---|---|---|---|---|---|---|---|---|---|---|---|---|---|---|---|---|---|---|
| a | b | c | d | e | f | g | p | q | r | | | | | | | | | | | | |
|  |  |  | 9/4 |  |  |  |  |  |  | | | | | | | | | 15 | 9/10 | K | ← ADDITIONAL FREIGHTER |
|  |  |  |  |  | 9/6 |  |  |  |  | | | | | | | | | 15 | 9/12 | A | |
|  |  |  |  | 9/8 |  |  |  |  |  | | | | | | | | | 15 | 9/14 | B | |
|  |  |  |  |  |  | 9/11 |  |  |  | | | | | | | | | 17 | 9/17 | C | |
|  |  |  |  |  |  |  | 9/11 |  |  | | | | | | | | | 14 | 9/17 | A | ← CHANGED FREIGHTER |
| 9/14 |  |  |  |  |  |  |  |  |  | | | | | | | | | 14 | 9/19 | D | |
|  |  | 9/13 |  |  |  |  |  |  |  | | | | | | | | | 15 | 9/20 | A | ← CHANGED FREIGHTER |
|  | 9/18 |  |  |  |  |  |  |  |  | | | | | | | | | 15 | 9/24 | D | |
|  |  |  | 9/21 |  |  |  |  |  |  | | | | | | | | | 17 | 9/27 | E | |
|  |  |  |  |  | 9/21 |  |  |  |  | | | | | | | | | 15 | 9/27 | A | |

FIG.11

TRANSACTION ADJUSTING DEVICE

TECHNICAL FIELD

The present invention relates to a transaction coordinating device for coordinating insertion of spot transactions based on temporary contracts with respect to fixed transactions based on contracts of predetermined term, for example, to a transaction coordinating technology capable of adjusting freighters used for spot transactions to be interrupted with respect to a plurality of regular freighters used for fixed transactions dealing with liquefied natural gas.

BACKGROUND ART

Natural gas is a kind of gas existing in the environment having methane as a principal component and is flammable possibly including other components such as hydrocarbon such as ethane, propane, butane and the like, carbon dioxide, nitrogen, hydrogen sulfide and the like. Liquefied natural gas (hereafter simply called LNG) is produced in the process of refining natural gas by generally eliminating impurities except for hydrocarbon, cooling the refined material at approximately minus 160 degree Celsius by low-temperature method, and liquefying the same for reducing the volume to one-six hundredth the volume in gaseous form.

LNG has advantages in being available for mass transit in one time by volume reduction and in generating less carbonic acid gas by burning in comparison to other fossil fuels. Further, LNG contains less impurity such as sulfur oxides and the like, and therefore, LNG recently receives widespread attention as clean energy with less adversely affecting the environment. On the other hand, plant facilities for producing LNG has a complex structure on a huge scale. Further, plant construction needs enormous amount of investments in terms of morality of the industry which indicates a necessity of making safety provisions. Additionally, as a special freighter for transporting LNG needs to be provided with extra low-temperature maintaining facilities for maintaining liquefied state of LNG during the transportation, freighter construction needs enormous amount of investments in the same reason.

Accordingly, producers and carriers of LNG have been traditionally concluding sales contracts of LNG based on a contract defining long-term stable acceptance clearly to make sure the recovery of the huge investments. For example, purchasers of LNG in Japan including major gas utilities, electric utilities and steel-mill giants and the like have been concluding long-term stable offtake contracts such as "LNG sales contract in 1973" with the producers and carriers of LNG for committing acceptance of constant amount at the time of conclusion each year of the fixed term of more than 20 years.

Thus, transactions of LNG generally take a form of a fixed transaction based on a stable long-term offtake contract, that is, a transaction in which transport schedules can be confirmed at least about a year before, or a transaction in which transport schedules can be confirmed at least about a year before on the basis that dealing amount has been confirmed more than a few years in advance based on a contract of the fixed transaction and the like. An LNG market and a charter market for LNG freighter for carrying out a spot transaction based on a temporary contract, that is, a transaction based on one-time sales contract or based on an intermittent supply contract which is completed in a few times of transaction are not provided.

In view of the recovery of the investment, a producer concludes a long-term contract on a condition of limited recourse finance composition and a carriers can recover the investments by concluding a long-term charter party, and therefore, a purchaser who is burdened with a contract clause of 'Take or Pay' (hereafter called T/P), that is, "You must take them or pay for them if not" bears the largest commercial risk. Therefore, sharing the purchaser's risk with other purchasers and with the producer or the carrier on the premise of transfer to other purchasers is considered as a condition to achieve expansion of spot transactions.

That is, if LNG project which doesn't necessarily require conclusion of a long-term contract over total amount of production is appeared, and if a carrier which is free from constraint by reciprocal relations appears at the same time, a spot transaction with quantitative degree of freedom may be practicable. If the scale of spot transaction is expanded, the expansion is assumed to have an impact with respect to the LNG market as will be mentioned below.

That is, in the United States, purchase price of LNG has a tendency to be determined by setting the price of natural gas in New York Mercantile Exchange (NYMEX) as an index on a net back basis, that is, on a basis of a theoretical price obtained by subtracting costs from the price of products in a consumer nation and inverse operating the result. And the price of natural gas in the United States is completely referred to demand and supply. Further, as for the LNG price destined for Europe, the price reflects demand and supply for the most part. Because the LNG price competes with prices of pipeline (hereafter simply called P/L) gas consisting of a plurality of supply sources under a net back system linked to competitive price of energy such as heavy oil, light oil, coal, electric power and the like.

By contrast, in Asia where the provision of P/L network is inadequate and relative long-term contract for ensuring stable supply holds a majority, as the LNG price is linked to the price of oil which is a competitive fuel, demand and supply of LNG is not reflected to the price system. On the other hand, a possibility is pointed out that countries planning to introduce LNG newly may have their own LNG price. And there are cases where the price determination is linked to the oil price or where the fixed price is adopted under the present circumstances. In the above-mentioned countries where the purchasers have relatively less credibility, a contract form which is not necessarily committed for the long term may be taken. With expansion of the spot transaction, a mechanism for determining the LNG price of existing players possibly becomes out of the mainstream of the market including new players. Consequently, a possibility that the LNG price may be off a linkage of the oil price is suggested.

Further, according to the circumstances such as sluggish demand for natural gas in Asia, entry of independent power producers (hereafter simply called IPP) into the market or deregulation of the electric industry and the gas industry and the like, the further of demand for LNG is uncertain. Then the transactions with consumer nations tend to be short-termed with small-lot, and therefore, startup of a new large-scale LNG project which requires acceptance of LNG with large amount in long term is expected to be difficult.

However, LNG is not commercialized (Commodity) in the present stage, no possibility of resale (trading) by involvement of the third parties is raised. But for the producers, there seems to be room for potential trading, because quantity of LNG production is constant while quantity demanded is fluctuated depending on the seasons and the climate. If the spot transaction becomes active, the number of players increases due to entry of IPP, and countries planning to introduce LNG newly, appearance of traders responsible for connecting the producers with the purchasers can be expected in future.

An ideal demand of natural gas and LNG for the producers is to maintain even delivery by corresponding to LNG production capacity of LNG liquefaction facilities, that is, monthly constant supply by constant production combining purchasers having various patterns of demand together. However, it is difficult to combine another producer with a purchaser, a producer with another purchaser or a purchaser with another purchaser without breaking delivery pattern insured between producers and purchasers under existing long-term contract.

If a scheme to startup a project without committing a part of contracted amount and securing all finances by long-term contracts is constructed through cost reduction of LNG project and dispersion of risk among the parties concerned in the future, advancement of spot transaction can be highly expected. Additionally, when uncertainty about stable supply arises, if a market has been created, products may be procured from the market. Thus, provision of LNG market through expansion of spot transaction is expected to be supplementary to long-term contracts including T/P and seemed to be worthwhile in terms of security of energy.

However, surplus production capacity and surplus transportation capacity which are regarded as essential conditions for development of spot transaction are limited narrowly. That is, it is under a circumstance that a scheme for responding to purchaser's needs by providing flexible transactions with respect to uncertain demand is not constructed completely Even in the event that new surplus capacity arises, it is hard to expect that the arisen capacity readily leads to expansion of transactions with a high degree of freedom.

Further, if producers, carriers, and purchasers are not exist independently in LNG market primarily, transportation capacity as a common carriage, that is, transportation capacity with general versatility would not arise. But in a current model of LNG transaction such as CIF (Cost Insurance and Freight term), that is, terms of sale specifying that a producer bears freight costs from a loading port to an unloading port and insurance premium for commodities, or FOB (Free On Board), that is, condition in which a producer load the commodities into a designated ship on the producer's own expense and responsibility and after the instant when delivery of the products are completed, ownership, expense and risk bearing are transferred to a purchaser, carriers are incorporated either in producers or purchasers.

In order that a purchaser pursue price incentive that is another essential condition for developing spot transaction under the above-mentioned condition, FOB is advantageous as means of transport is reserved on one's own However, it is difficult for a purchaser to take advantage of the price incentive in a strong, relative business relation with a producer based on a rigid contract clause of a long-term contract with T/P. Accordingly, there is a problem that development of spot transaction in LNG market is accompanied with a great deal of difficulties.

It is therefore an objective of the present invention to provide a transaction coordinating device, system, methods, information recording medium and program products capable of inserting a commodity transaction with flexible contract into commodity transactions with rigid contract easily.

DISCLOSURE OF THE INVENTION

To solve the above-mentioned problem, a transaction coordinating device relating to the present invention is a transaction coordinating device for coordinating an insertion of a cargo transportation based on a temporary contract without significant affection of cargoes' unloading schedule respect to fixed transactions based on contracts of predetermined term.

According to the above-mentioned invention, as the transport adjusting portion manages the schedule of cargo transportation of the fixed transaction at all time, even in the event that a spot transaction arises suddenly, the cargo transportation of the spot transaction can easily be inserted into the schedule of cargo transportation of the fixed transactions. Therefore, the present invention is effective especially for a stable but rigid long-term transaction and capable of making cargo transportation window for one or more spot transaction without significant affection onto the predetermined annual cargoes unloading schedule under the long-term transaction.

Additionally, a transportation data storing portion for storing data associated with the above-mentioned transportation can be provided in order that the above-mentioned transportation adjusting portion may adjust an interruption of commodity transportation based on the data associated with the above-mentioned transportation from the above-mentioned transportation data storing portion. Further, it is also acceptable that the above-mentioned transportation data storing portion for storing data associated with the above-mentioned transportation and a condition-of-transactions delivering portion for delivering a condition relating to said spot transaction from a party on one side with respect to a party on the other side of the above-mentioned spot transaction are provided in order that the above-mentioned transportation adjusting portion may adjust an insertion of cargoes transportation of the above-mentioned spot transactions based on the above-mentioned conditions of the spot transaction from the above-mentioned conditions-of-transactions delivering portion and data associated with the above-mentioned transportation from the above-mentioned transportation data storing portion.

For details, the above-mentioned transportation adjusting portion arranges an insertion of cargoes transportation of the above-mentioned spot transaction without changing the above-mentioned unloading schedule of the cargoes, and additionally arranges the insertion of cargoes transportation of the above-mentioned spot transaction by changing the above-mentioned schedule of transportation when the above-mentioned coordination is impossible, and further arranges the insertion of cargoes transportation of the above-mentioned spot transaction by changing another schedule of transportation within a certain range when the above-mention adjustment is still impossible, and furthermore, arranges the insertion of cargoes transportation of the above-mentioned spot transaction by further changing another schedule of transportation within an range to which the certain range is expanded when the above-mentioned adjustment is still impossible.

More concretely, liquefied natural gas is applicable as the above-mentioned transacting commodities and cases containing the above-mentioned liquefied natural gas transported on the sea or on road are available as the above-mentioned means for transportation. And the insertion of cargoes transportation of the above-mentioned spot transaction is arranged at least by adjusting overall transportation schedule utilizing the difference between the preset number of days for operating the transportation of the above-mentioned cases and the minimum number of days actually required for such transportation.

BRIEF DESCRIPTION OF THE DRAWINGS

FIG. 6 is a drawing for showing a second example of a display screen in the process of transport simulation mode of FIG. 4, FIG. 7 is a drawing for showing a third example of a display screen in the process of transport simulation mode of FIG. 4, FIG. 8 is a drawing for showing a fourth example of a display screen in the process of transport simulation mode of FIG. 4, FIG. 9 is a drawing for showing a fifth example of a display screen in the process of transport simulation mode of FIG. 4, FIG. 10 is a drawing for showing a sixth example of a display screen in the process of transport simulation mode of FIG. 4, and FIG. 11 is a drawing for showing a seventh example of a display screen in the process of transport simulation mode of FIG. 4.

BEST MODE FOR CARRYING OUT THE INVENTION

Figure 1:
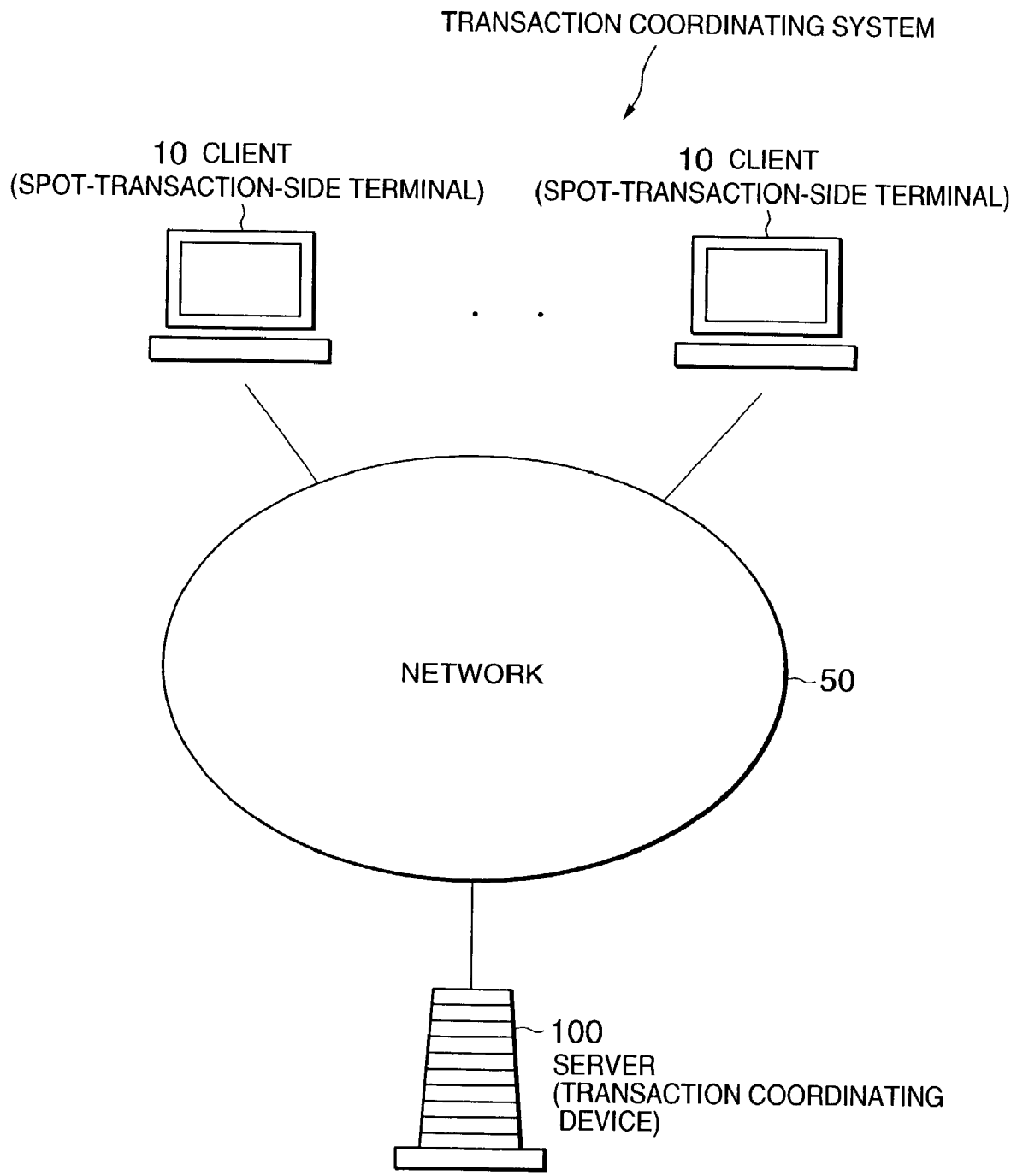
FIG. 1 is a conceptual drawing for showing a transaction coordinating system relative to a preferred embodiment of the present invention.

Referring now to the drawings, preferred embodiments of the present invention are described more particularly. Hereinafter, each number is corresponding to each member respectively in the accompanying drawings and some overlapping explanations are abbreviated. The embodiments of the present invention is effective for implementing the present invention. However, the present invention is not intended to be limited to the specific embodiment described here.

Figure 2:
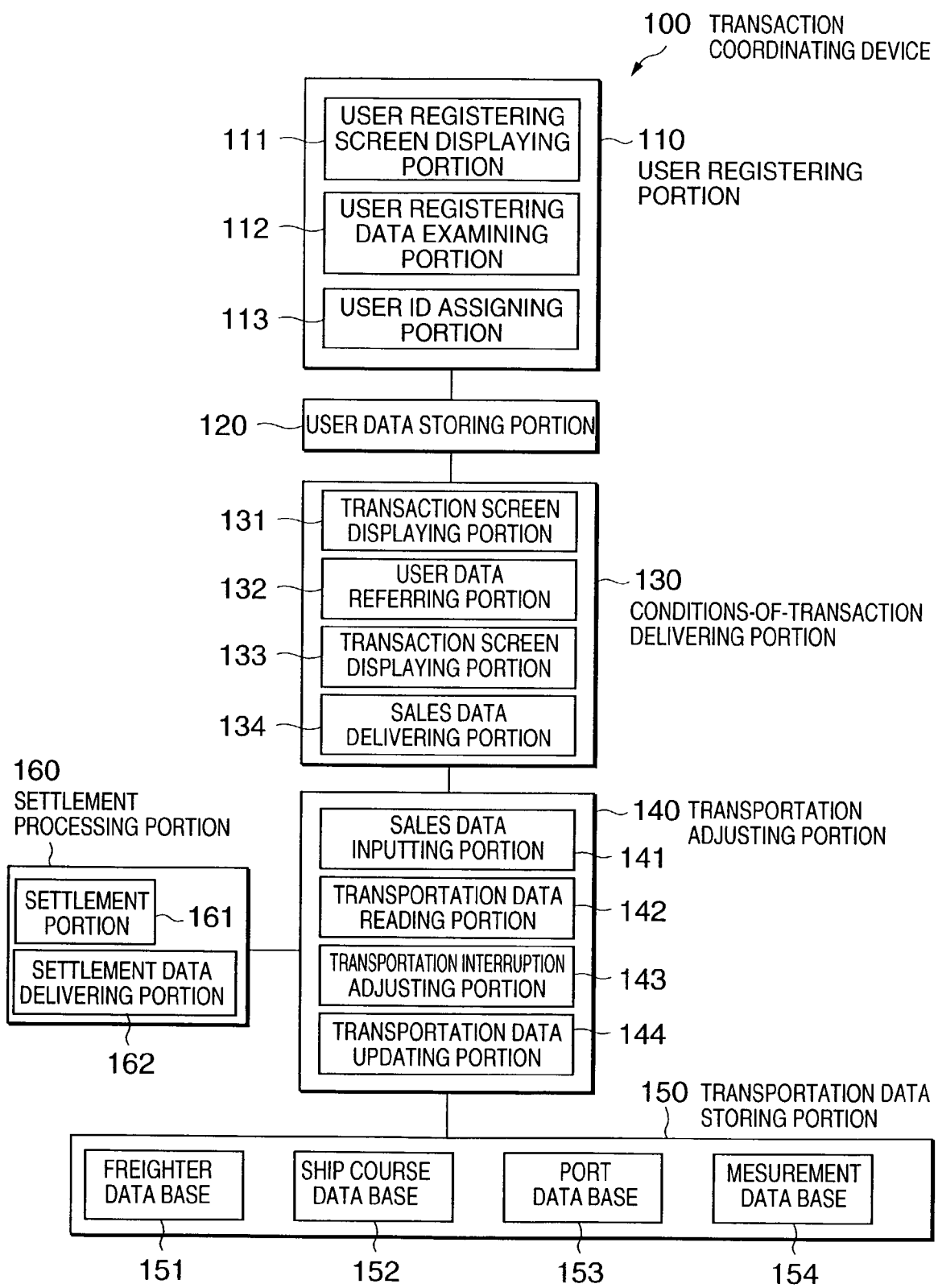
FIG. 2 is a block diagram for showing details of a transaction coordinating device in the transaction coordinating system shown in FIG. 1.
Figure 3:
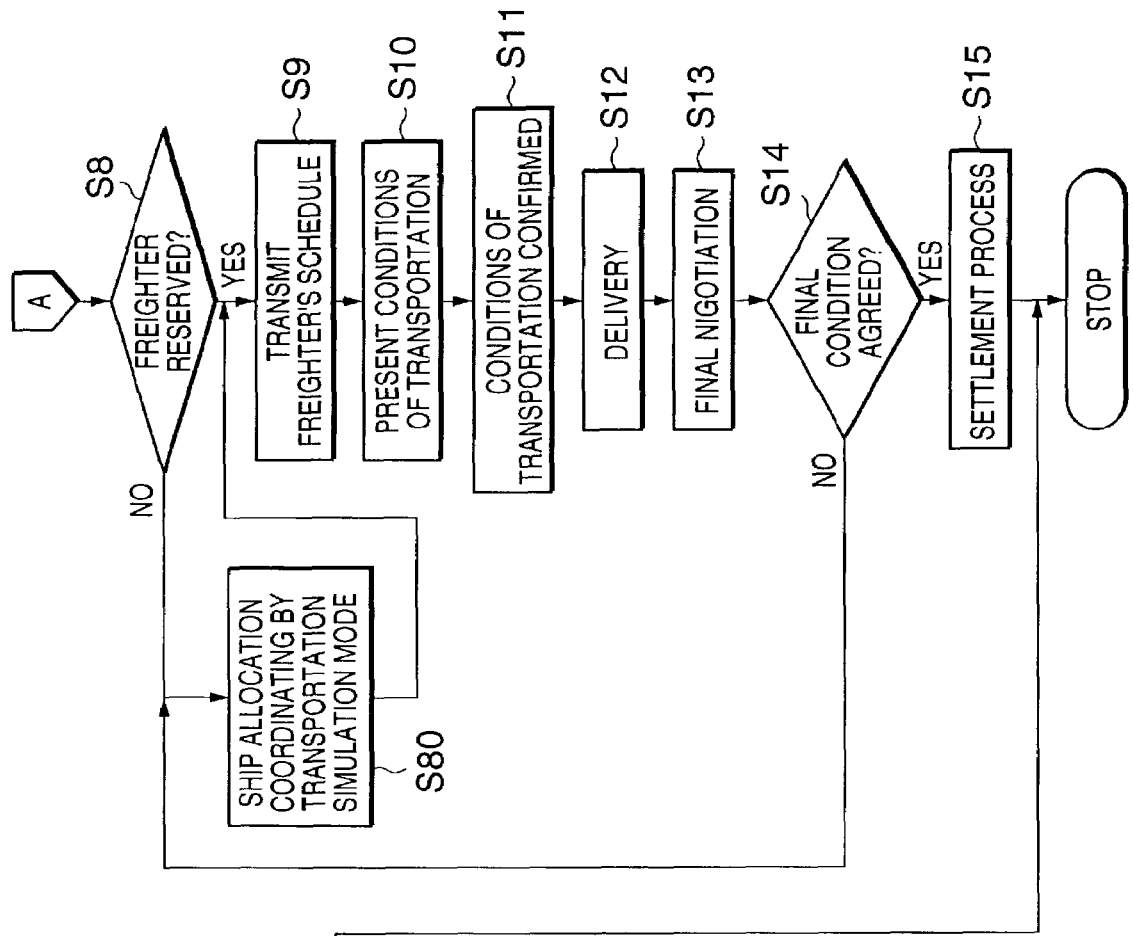
FIG. 3 is a flowchart for showing a process of coordinating a transaction in the transaction coordinating system shown in FIG. 1.
Figure 3:
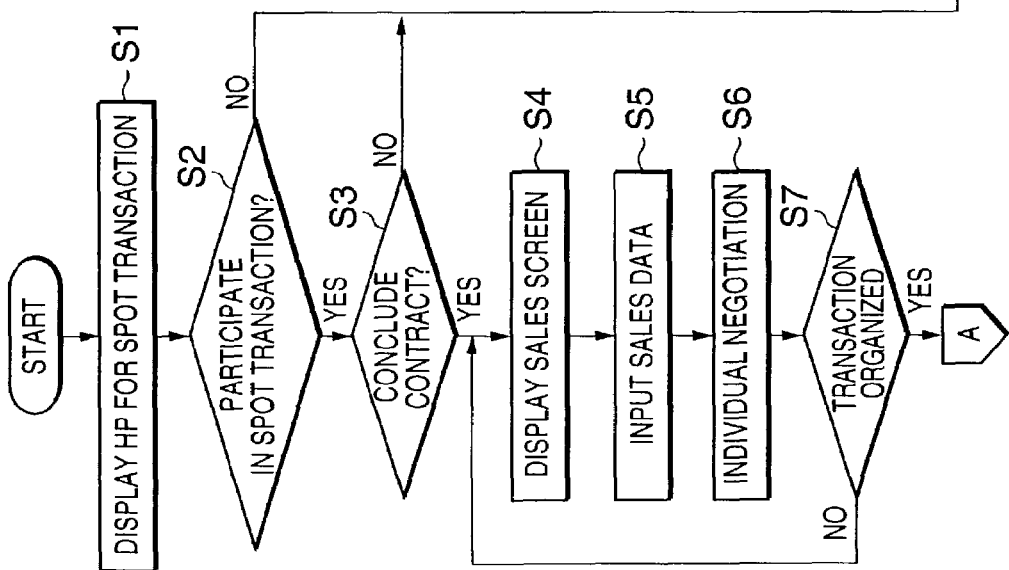

FIG. 1 is a conceptual drawing for showing a transaction coordinating system which is one of the preferred embodiments of the present invention, FIG. 2 is a block diagram for showing details of a transaction coordinating device in the transaction coordinating system shown in FIG. 1, and FIG. 3 is a flowchart for showing a process of coordinating a transaction according to the transaction coordinating system shown in FIG. 1.

As it is shown in FIG. 1, a transaction coordinating system of the present embodiment is a transaction coordinating system for coordinating an interruption of a spot transaction based on a temporary contract with respect to a fixed transaction based on a contract of predetermined term such as long-term transaction and the like, in which LNG is regarded as transacting commodity and a freighter is used as means for transportation.

The transaction coordinating system has a composition in which a spot-transaction-side terminal 10 which is operated on a side of conducting a spot transaction and functions as a client and a transaction coordinating device 100 which functions as a server for coordinating an interruption of a spot transaction with respect to a fixed transaction are provided being connected to a network 50 via a communications circuit respectively. Incidentally, the spot-transaction-side in the present embodiment refers to a supplier and a buyer who perform an offer (applying a sales contract) or bid (bidding by auction).

Here, a computer device comprising a main body, a displaying portion and an inputting portion is assumed as the spot-transaction-side terminal 10 functioning as a client and as the transaction coordinating device 100 functioning as a server. But it is not limited to only a computer device but also any devices connectable to the network 50 are included. For example, a telephone, a television set and the like are also applicable as the spot-transaction-side terminal 10.

Additionally, an open network such as the Internet and the like are preferable as the network 50, but a closed network such as intranet and the like are also applicable. Though the transaction coordinating device 100 is of coordinating an interruption of a spot transaction with respect to a fixed transaction, the same is applicable with respect to an independent spot transaction or other transactions than the spot transaction. Further, the transaction coordinating device 100 is also applicable with respect to a transaction without using the network 50.

As shown in FIG. 2, the spot-transaction-side terminal 10 provides a user registering portion 110, a user data storing portion 120, a conditions-of-transaction delivering portion 130, transportation adjusting portion 140, a transportation data storing portion 150 and a settlement processing portion 160.

Here, the user registering portion 110 provides a user registering screen displaying portion 111, a user registering data examining portion 112 and a user ID assigning portion 113. The user registering screen displaying portion 111 displays a screen for a user registration on a displaying portion in the spot-transaction-side terminal 10. The user registering data examining portion 112 examines qualification of user registering data input from the spot-transaction-side terminal 10 by a participant who becomes a supplier or a buyer of LNG in a spot transaction.

The user ID assigning portion 113 assigns a user code and a password to a participant who passed the qualification examination and writes the code and the password into the user data storing portion 120 together with the user registering data of the participant. Accordingly, each participant conducts a spot transaction by using assigned user code and password. According to details of the user registration, each participant receives an ID (Identification) classified hierarchically, that is, the first hierarchy of suppliers, buyers and traders, the second hierarchy of participating countries, and the third hierarchy of each user's individual code.

The conditions-of-transaction delivering portion 130 provides a transaction screen displaying portion 131, a user data referring portion 132, a sales data delivering portion 133 and a transportation-adjusting-data delivering portion 134. The transaction screen displaying portion 131 displays various kinds of screen for a spot transaction on a displaying portion in the spot-transaction-side terminal 10. The user data referring portion 132 refers a user code and a password of a participant in a spot transaction input from the spot-transaction-side terminal 10 to the user data read from the user data storing portion 120.

The sales data delivering portion 133 delivers sales data of a participant in the spot transaction input from the spot-transaction-side terminal 10 to the other participant and transmits the sales data to the transportation adjusting portion 140 when the spot transaction is organized by the sales data. And the transportation-adjusting-data delivering portion 134 delivers a transportation adjusting data from the transportation adjusting portion 140 to the participant concerned.

The transportation adjusting portion 140 provides a sales data inputting portion 141, a transportation data reading portion 142, a transportation insertion arranging portion 143 and a transportation data updating portion 144. The sales data inputting portion 141 inputs sales data from the conditions-of-transaction delivering portion 130. The transportation data reading portion 142 reads predetermined transportation data from the transportation data storing portion 150.

The transportation insertion arranging portion 143 arranges an insertion of cargoes transportation of a spot transaction with respect to a schedule of cargoes transportation of a fixed transaction based on the input sales data and the read transportation data, and transmits the transportation adjusting data to the conditions-of-transaction delivering portion 130. The transportation data updating portion 144 updates the transportation data stored in the transportation data storing portion 150.

The transportation data storing portion 150 provides a freighter database 151, a ship course database 152, a port database 153 and a measurement database 154. The freighter database 151 stores data of, for example, a transportation schedule, a spec, status, history, registry, day rates of a freighter and the like in the form of a table. The transportation schedule is a data table storing a vessel name, a contract number of each freighter, nautical number, date and time of departure from a shipping port, date and time of arrival at an unloading port, a shipping port, an unloading port, an accepting user, kinds of contract, number of day of navigation, reallocation, dry dock and the like of each project.

The spec is a data table of freighters, operators, crew, shipping amount, forms, speed, BOG (Boil Off Gas) rates and the like. The status is a data table of a cool down element such as time for cool down a temperature in a LNG storing portion (tank) of a LNG freighter from the ordinary temperature to a liquefying temperature and the like, required heel amount such as a certain amount of LNG preserved for maintaining a low temperature at departure and the like, required fuel and the like of the amount changeable depending on whether the vessel is capable of using LNG vaporized naturally as fuel or not and the like. The history I a data table of ports visited in the past and the like, and the registry is a data table associated with registered place of the vessel and the like.

The ship course database 152 stores data of, for example, kinds of ship course, insurance, fare, regulation, weather condition and the like in the form of a table. Kind of ship course is a data table of travel distance and the like, fare is a data table of toll for passing through a strait and the like, and regulation is a data table of time zone allowing passage through a strait and the like. The port database 153 stores data of, for example, status, port regulations (MSA regulations), environmental regulations, ancillary facilities, port charge and the like in the form of a data table.

State is a data table of spec of a berth, situation of a pass and the like, and port regulations is a data table of limitation of berthing through night time and the like. Environmental regulations is a data table of discharge restriction of ballast water and the like, and ancillary facilities is a data table of utility and the like of fuel supply and the like. A measurement database 154 stores data of, for example, a calculation of amount of heating value, a component analysis, an independent testing organization and the like in the form of a data table.

The settlement processing portion 160 provides a settlement portion 161 and a settlement data delivering portion 162. The settlement portion 161 creates settlement data based on sales data, price data, transportation data, transportation adjusting data and the like. The settlement data delivering portion 162 delivers the created data to participants concerned.

Referring now to the flowchart of FIG. 3, a process of coordinating a transaction according to the transaction coordinating system having a composition as mentioned above. Incidentally, it is assumed that each participant of the spot transaction who may become a supplier or a buyer of LNG has already completed the user registration by using the spot-transaction-side terminal 10 and received a user code and a password.

Firstly, a participant of the spot transaction of LNG calls up a display of HP (Home Page) for the LNG spot transaction on a displaying portion of the spot-transaction-side terminal 10 (step S1). Incidentally, the access to the HP is not limited only to participants of the spot transaction but also available for all members who have completed the user registrations as a participant of the HP. In the event of participating in the spot transaction (step S2), each participant makes an entry into a screen of offer/bid (step S4) by giving the consent to the contents that the spot transaction is a dealing corresponding to the sales contract standard model and the transportation contract standard model applied to the spot transaction posted on the HP at all time (step S3).

Next, following to the posting format in an offer inputting screen of 'sell' or 'buy', each participant inputs data such as term, amount, price, transfer, conditions of acceptance, shipping and unloading port, timing of delivery, existence of transportation and the like and post the data on an electronic bulletin board attached to the HP. Each participant who completed posting of offer on the bulletin board can select either to sign on or not. And each participant can change the specification and corresponding specification on the participant providing the bulletin board. The specification is available on the above-mentioned three hierarchies and the bulletin board is opened only with respect to the participants complying with all conditions.

Then, only the participants to whom the bulletin board is opened can bid with respect to the offer and input a deviation from the offer for posting the same on the electronic bulletin board attached to the HP following to the posting format in the bid inputting screen interlocked with the posting of offer. Each participant who completed posting of bid on the bulletin board can select either to sign on or not. Additionally, making an access to each bid-posting is restricted only to the participants who posted the particular bid and the participants who posted the offer (step S5).

After posting the bid, the participant who posted the bid and the participant who posted the offer start an individual negotiation on an interactive base on the bulletin board restricted only to the above-mentioned participants to make an access (step S6). The finally agreed condition of the individual negotiation is reflected in the sales contract standard model posted on the HP and recognized as a completed sales contract. Then the user code and the password of both participant who posted the bid and the participant who posted the offer are verified. The transaction is established with the result of verification (step S7).

According to the establishment of the transaction, with respect to a participant responsible for a transportation arrangement under the contract based on the request of the participant posted on the bulletin board in the HP, retrieving is executed in order of precedence mentioned below. As the result of the retrieving, a freighter and a contractor of the charter party that can provide technical (retrieving of spec of shipping and unloading port, qualification adoptable to transportation of contracted amount) and commercial possibility of a transportation contract are supplied in a sequence mentioned below.

The first precedence: A freighter navigating on a ship course from a shipping port to an unloading port of the completed transaction, in which an ballast navigation is available.

The second precedence: A freighter navigating on a ship course including both of the shipping port and the unloading port of the completed transaction.

The third precedence: A freighter navigating on a ship course including one of the shipping port and the unloading port of the completed transaction.

The fourth precedence: A freighter navigating on a ship course excluding both of the shipping port and the unloading port of the completed transaction.

The fifth precedence: A mooring freighter.

Further, in each of the above-mentioned precedence, an existing schedule of a ship course and date of shipping is transferred, maintaining the date of shipping previously scheduled in an existing position of allocation of ships on the side of the carrier to which the particular freighter belongs. And retrieving by a simulation mode for presuming available date of shipping, after the creation of required extra space and presumption by referring to stock position of a shipping point. A transport schedule of an existing freighter classified by project can be referred in the form of a table.

The table comprises items such as contract number of existing vessel, nautical number, date and time of departure from a shipping port, date and time of arrival to an unloading port, shipping port, unloading port, accepting user, kind of contract, number of days of navigation and others, and states of allocation of ships can be seen at sight. Additionally, special circumstances of each navigation such as reallocation, dry-dock and the like are spelled out as other items.

Further, a positional information screen in which a location of each vessel is calculated according to the allocation of vessels and shown graphically on a world map information which belongs to the system is displayed in the simulation mode. Arranging and reviewing the transportation visually become possible by browsing the simulation mode watching the positional information screen. Incidentally, in the event that a vessel equipped with GPS (Global Positioning System) communication facility, positional information based on the GPS information can be displayed graphically.

Providing the simulation function as mentioned above, even in the simple event that supply does not meet demand, making a judgment of availability of supply by transferring the shipping space in an existing transportation schedule and working out the allocation position for a new spot transaction (creation of a 'window'). The above-mentioned creation of a 'window' is conducted in two steps, that is a first mode (transport simulation mode) for searching the extra space in the vessel by transferring the existing allocation position in the event that matching of transportation and delivery is not organized, and, a second mode (production simulation mode) for searching extra productive capacity by transferring the existing allocation position (step S8, S80)

Data of the freighter and the contractor of charter party browsed by the steps as mentioned above and the schedule of the freighter and the associated group of freighters browsed through the simulation mode is transmitted via the bulletin board on the HP only to the party responsible for transportation arrangement in the particular transaction and the contractor of charter party of the freighter (step S9). The contractor of the charter party who received the transmission presents compensation for transportation and other conditions to the party responsible for transportation arrangement in the particular transaction via the bulletin board by utilizing the format under the similar condition of transportation standard model posted on the present HP (step S10).

The party responsible for ship arrangement who received the presentation enters into negotiations with the contractor of charter party on an interactive basis via the bulletin board to confirm the conditions of transportation. After the conditions of transportation are firmed (step S11), delivery is conducted under the system utilizing EDI (Electronic Data Interchange) (step S12), and the final negotiation is launched (step S13). When the final condition does not reach an agreement (step S14), the transportation arrangement is re-coordinated by transport simulation mode going back to step S80. When the final condition reached an agreement (step S14), settlement is processed finally (step S15).

Figure 4:
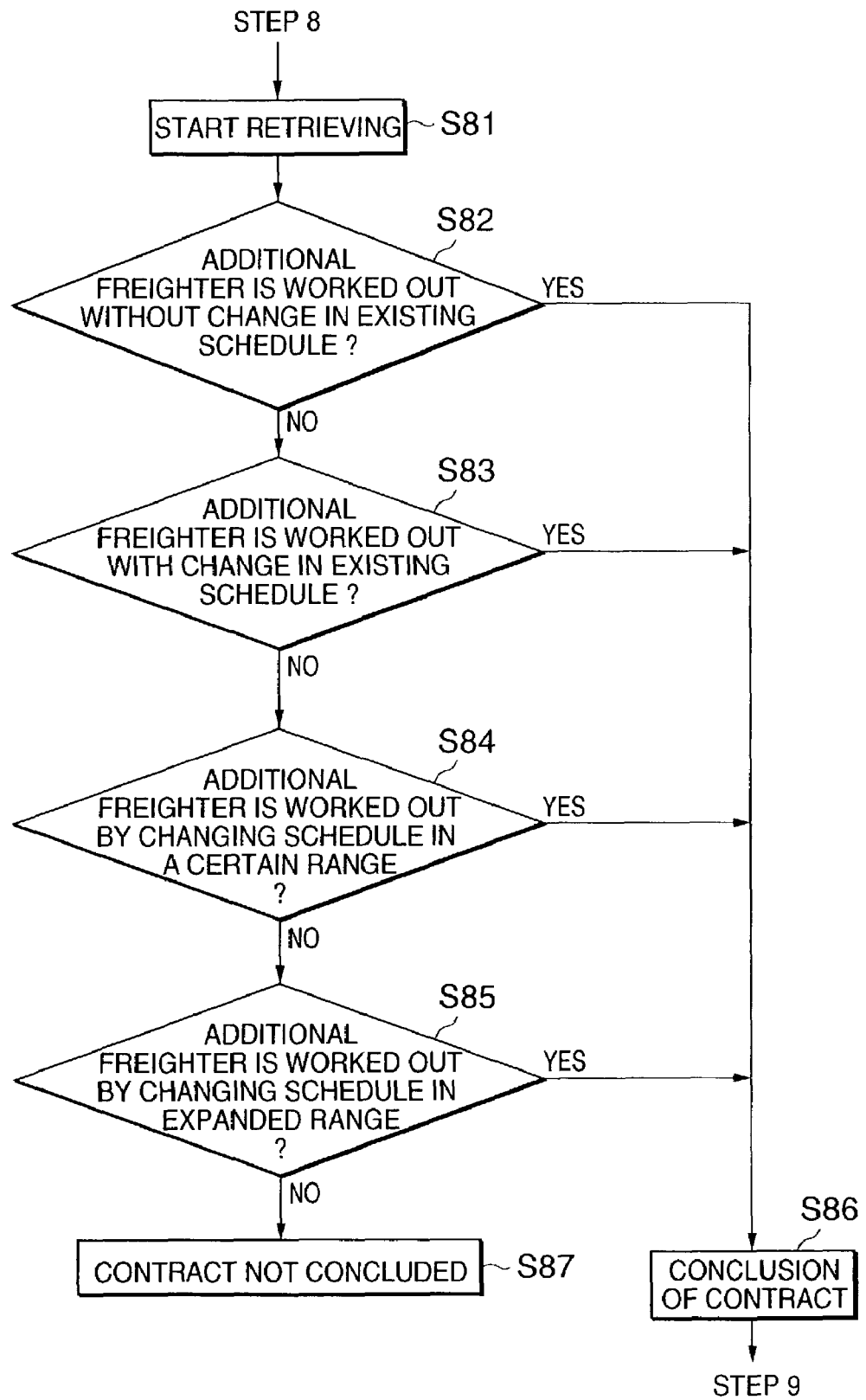
FIG. 4 is a flowchart for showing a process in transport simulation mode at step S8 of the process of the coordinating a transaction described in FIG. 3.
Figure 5:
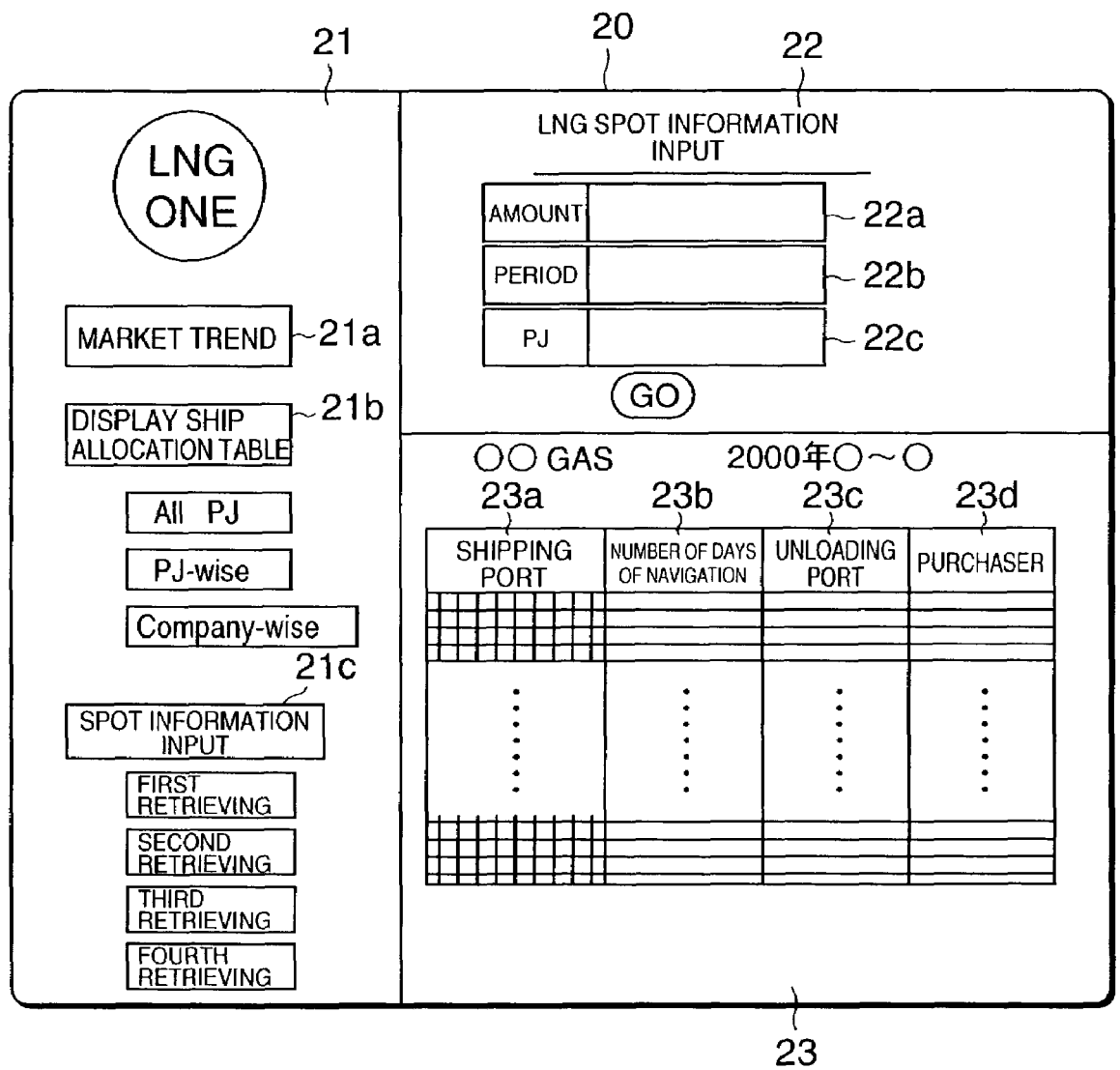
FIG. 5 is a drawing for showing a first example of a display screen in the process of transport simulation mode of FIG. 4.

Next, a mode for working out a position of ship arrangement for a new spot transaction by transferring the position of ship arrangement and searching extra space in the transport simulation mode in step 80 under the process of coordinating the transaction described in FIG. 3, that is, in an existing transportation schedule is described referring to the flowchart of FIG. 4 and display screens of FIGS. 5 through 11.

Firstly, a retrieving screen 20 as shown in FIG. 6 is displayed. The retrieving screen 20 is divided into two parts of right and left. Further, the right side is divided into two of upper and lower parts, the left side displays a menu screen 21, the upper part of the right side displays a spot information inputting screen 22, and the lower part of the right side displays a ship-arrangement-table displaying screen 23. In the menu screen 21, an LNG market trend button 21a, a ship-arrangement-table display button 21b for displaying the ship-arrangement in a project and the like, and a spot information inputting button 21c capable of retrieving transport coordination in steps (four steps in the present example) are displayed.

And in the spot information inputting screen 22, the amount of LNG 22a, period 22b, project 22c and the like are displayed by selecting the spot information inputting button 21c. Further, in the ship-arrangement-table displaying screen 23, a transport schedule such as a schedule of the shipping port 23a, number of days of navigation 23b, a schedule of the unloading port 23c, a buyer 23d and the like classified by each particular LNG freighter are displayed by selecting the ship-arrangement-table display button 21b. After displaying the retrieving screen 10 as described above, retrieving is started in steps by inputting necessary information into the spot information inputting screen 22 (step S81).

Here, generally, number of days required for a round trip (from a shipping port back to the shipping port via an unloading port) is remarked in the item of number of days of navigation, which is set concerning distance to the destination and speed of a freighter. Accordingly, the number of days of navigation is set more than required minimum number of days of actual navigation. In the event that the set number of days of navigation has room, an interruption of commodity transportation of a spot transaction is adjusted by utilizing the extra space, that is, working out an additional freighter becomes possible.

Then, retrieving whether arranging an insertion of cargoes transportation of a spot transaction, that is, working out an additional freighter is possible or not is executed in a first retrieving without changing the schedule of cargoes transportation of the existing fixed transaction. (step S82). For example, with respect to a schedule of commodity transportation of existing fixed transaction as shown in FIG. 6, an event of insertion of cargoes transportation of a spot transaction with a schedule of shipping at port X on September $4^{th}$ and unloading at port Y on September $10^{th}$ is assumed. In the fixed schedule, number of days of navigation between the port X and the port Y by each of freighters a through g is set in 16 through 19 days. But the minimum number of days required for the actual navigation between the port X and the port Y by each of freighters a through g is 14 days, and preset number of days of navigation has room.

Accordingly, the first freighter d in an existing schedule is allocated as an additional freighter at first and rest of the freighters f, e, g, c, a, b, d are shifted sequentially to be allocated to the original purchaser of the existing schedule. Then, number of days earned by reducing the number of days of each navigation of each freighter in the existing schedule are allocated to the additional number of days of navigation of a freighter. In the event that there is no problem according to the above-mentioned process, that is, a transportation schedule can be rearranged as shown in FIG. 7, the insertion of cargoes transportation of the spot transaction can be arranged without changing the schedule of cargoes transportation of the existing fixed transaction, that is, an additional freighter can be worked out. Thus, the contract is made (step S86).

On the other hand, in the event that an additional freighter can not be worked out in the first retrieving, the step proceeds to a second retrieving. In the second retrieving, a schedule of cargo transportation of an existing fixed transaction is changed, for example, a change of transportation schedule is made in an identical project (step S83). For example, with respect to a schedule of commodity transportation of an existing fixed transaction as shown in FIG. 8, an event of interrupting commodity transportation of a spot transaction with a schedule of shipping at port X on September $4^{th}$ and unloading at port Y on September $10^{th}$ is assumed. A different point of the existing schedule of FIG. 8 from the existing schedule of FIG. 6 is that the number of days of navigation of freighter c turns to 14 days from 16 days.

Therefore, an initial freighter d of the existing schedule is allocated as an additional freighter and rest of the freighters f, e, g, c, a, b, d are shifted sequentially to be allocated to the original purchaser of the existing schedule. Further, number of days earned by reducing the number of days of each navigation of each freighter in the existing schedule are allocated to the additional number of days of navigation of a freighter. Accordingly, as shown in FIG. 9, the schedule of the freighter c shipping at port X on September $11^{th}$ and unloading at port Y on September $17^{th}$ must be changed to September $13^{th}$ and September $19^{th}$ respectively.

Possibility of the change is determined depending on a stock status of LNG tank in the shipping port and unloading port and an occupancy status of berths. If the change is possible, an insertion of cargoes transportation of a spot transaction can be arranged, that is, an additional freighter can be worked out by changing the schedule of commodity transportation of the existing fixed transaction. Thus, the contract is made (step S86).

On the other hand, in the event that an additional freighter can not be worked out in the second retrieving, the step proceeds to a third retrieving. In the third retrieving, a schedule of cargo transportation of another fixed transaction is changed within a certain range, for example, a change of transportation schedule of other project of an identical country is made (step S84). For example, with respect to a schedule of cargo transportation of an existing fixed transaction as shown in FIG. 10, an event of insertion of a cargo transportation of a spot transaction with a schedule of shipping at port X on September $4^{th}$ and unloading at port Y on September $10^{th}$ is assumed. A different point of the existing schedule of FIG. 10 from the existing schedule of FIG. 8 is that a freighter p which is operated under the transportation schedule of other project of the identical country is included.

Accordingly, an initial freighter d of the existing schedule is allocated as an additional freighter and rest of the freighters f, e, g, p, c, a, b, d are shifted sequentially to be allocated to the original purchaser of the existing schedule. Further, number of days earned by reducing the number of days of each navigation of each freighter in the existing schedule are allocated to the additional number of days of navigation of a freighter. Accordingly, as shown in FIG. 11, the freighter g must be changed to the freighter p of the other project of the identical country and the freighter p of the other project of the identical country must be changed to the freighter a.

Possibility of the change is determined depending on a stock status of LNG tank in the shipping port and unloading port and an occupancy status of piers and the like. If the change is possible, an insertion of cargo transportation of a spot transaction can be arranged, that is, an additional freighter can be worked out by changing the schedule of cargoes transportation of another fixed transaction within a certain range. Thus, the contract is made (step S86).

On the other hand, in the event that an additional freighter can not be worked out in the third retrieving, the step proceeds to a fourth retrieving. In the fourth retrieving, a change of schedule of cargo transportation of another fixed transaction within a range to which the above-mentioned certain range is expanded, for example, a change of schedule of cargoes transportation of another project of other country is made. More concretely, an extra shipping space under the contract except for the contract concluded between a particular supplier and a buyer, that is, utilization of an extra shipping space of a freighter under a contract concluded by other than a particular supplier and a particular buyer, or utilization of an extra shipping space of a freighter which is not used by a particular supplier and a buyer under an existing contract is assumed (step S85).

Possibility of the change is determined depending on a spec of a freighter, consistency of the shipping and the unloading ports with the freighter, past records of acceptance and the like. If the change is possible, an insertion of cargo transportation of a spot transaction can be arranged, that is, an additional freighter can be worked out by changing the schedule of cargoes transportation of another fixed transaction within a range to which the certain range is expanded. Thus, the contract is fulfilled (step S86). On the other hand, in the event that an additional freighter can not be worked out by the fourth retrieving, the process is discontinued with the contract broken.

According to the transaction coordinating system of the present embodiments as mentioned above, inauguration of EDI for the communications in LNG business, centralized management of physical distribution and settlement, establishment of spot market, and further, dealing the general energy through a network are promoted.

And a supplier can avoid mistakes in re-inputting by the inauguration of EDI for the communication, can directly input an invoice to a database via the Internet by the inauguration of EDI for the settlement, and further can omit double-input by linkage to key system of a buyer. Further, various kinds of information such as statistical data and the like can be output automatically from the above-mentioned database. Additionally, it becomes possible to utilize past accumulated data effectively by integrating document exchanges between each of players performed conventionally by a facsimile or a telex into the present EDI system as electronic information.

LNG import operations are integrated longitudinally by centralized management of physical distribution and settlement, and LNG import operation of each country can be integrated laterally by applying the standardized system. Further, LNG import operation can be information-systemized with high efficiency by summarizing the LNG import operation and coordinating operation in the system. Further more, it is possible to fluidize and commercialize the present rigid LNG transaction by integrating ship allocating operation of each country and constructing a SCM (Supply Chain Management) system of LNG for sharing stock information associated with LNG from an upper to a lower stream.

For example, in the event that an electric utility A desires to purchase new LNG, in the present circumstances, the electric utility A have to review supply condition and price trend, commit a coordination to each trading company in charge, and wrap up the negotiation with a supplier to purchase the LNG under a long-term or short-term contract depending on conditions. However, after the system is constructed, a person in charge of the electric utility A can grasp the supply condition of LNG in each country by browsing the system and sound out on requiring amount of LNG on the system. Then, a person in charge in each producer of LNG replies with best offer with respect to the offer on the system.

In the above-mentioned embodiments, an example of using a vessel for transportation of LNG which is a transaction commodity is described. However, the present invention is applicable in the same manner to the event of using cases containing LNG to be conveyed on road, for example, by a lorry. In the above-mentioned event, an interruption of LNG transportation can be adjusted based on at least a predetermined number of days of operation and the actually required minimum number of days of operation of the cases.

Further, the present invention is not limited to aspects in the above-mentioned examples assuming LNG as transaction commodity and freighters and lorries as means of transportation. The present invention is applicable to transaction commodity and means of transportation for the purpose of interrupting spot transaction based on a temporary contract with respect to fixed transactions based on contracts of predetermined term.

Incidentally, the transaction coordinating technology as mentioned above can not only be stored and executed in the information recording medium, for example, CO-ROM and the like but can also be circulated via a network as a program product.

As it becomes clear in the description above, efficiency as mentioned blow is obtained according to the present invention.

That is, the present invention is capable of managing schedules of commodity transportation of fixed transactions at all time. Therefore, even in the event that a spot transaction arises suddenly, commodity transportation of a spot transaction can be interrupted easily into a schedule of commodity transportation of fixed transaction. The present invention is particularly effective with respect to a stable but rigid long-term transaction and capable of transform the transaction to a flexible long-term transaction.

POSSIBILITY OF INDUSTRIAL USE

The present invention has a composition as mentioned above, which is capable of managing schedules of commodity transportation in fixed transactions at all time and interrupting commodity transportation of the spot transaction easily into a schedule of commodity transportation of fixed transaction, even in the event that a spot transaction arises suddenly. Therefore, the present invention is particularly effective with respect to a stable but rigid long-term transaction and capable of transform the transaction to a flexible long-term transaction.

The invention claimed is:

1. A transaction coordinating device for coordinating an insertion of a spot transaction based on a temporary contract being made without respect to a fixed transaction based on a contract of predetermined term, said spot transaction comprising a transaction based on a one-time sales contract or based on an intermittent supply contract which is completed in a few times, said fixed transaction comprising a long-term stable offtake contract of predetermined term in which transportation schedules can be confirmed at least about a year before, said transaction coordinating device comprising:

means for arranging an insertion of a cargo transportation relating to said spot transaction into a predetermined schedule of a cargo transportation relating to said fixed transaction of predetermined term, said insertion being arranged by adjusting the predetermined schedule of said cargo transportation relating to said fixed transaction of predetermined term; and means for delivering sales data of the spot transaction to participants in the spot transaction and to the insertion arrangement means and delivering transportation adjusting data from the insertion arrangement means to the participants in the spot transaction, wherein:

said insertion arrangement means arranges an adjustment of cargo transportations in a first transportation schedule by an insertion of a cargo transportation of said spot transaction without changing said first transportation schedule, said first transportation schedule comprising shipping dates, unload dates, minimum days of navigation, and scheduled days of navigation for one or more freighters, said adjustment of cargo transportations comprising a first freighter in said first transportation schedule being allocated as an additional freighter and a remainder of freighters in said first transportation schedule being shifted sequentially to be allocated to an original scheduled transportation of said first transportation schedule, said insertion arrangement means arranges an insertion of a cargo transportation of said spot transaction by changing said first transportation schedule only in an event that the cargo transportation adjustment is impossible, said changing of said first transportation schedule comprising changing one or more of a date when a freighter ships, a date when a freighter unloads, and a number of days a freighter is under navigation, said insertion arrangement means arranges an insertion of cargo transportation of said spot transaction by changing a second transportation schedule within a certain range only in an event that the first transportation schedule changing is impossible, said changing of second transportation schedule comprising one or more of moving a freighter from said second transportation schedule into said first transportation schedule and moving a freighter from said first transportation schedule into said second transportation schedule, and said insertion arrangement means arranges an insertion of cargo transportation of said spot transaction by changing another transportation schedule within a range to which said certain range is expanded only in an event that the second transportation schedule changing is impossible, an adjustment or change being impossible if said adjustment or change would result in a failure to comply with terms of a fixed transaction.

2. A transaction coordinating device as claimed in claim 1, further comprising:
   means for storing data associated with said transportation, wherein
   said insertion arrangement means arranges an insertion of said cargo transportation of said spot transaction based on data associated with said transportation transmitted from said transportation data storing means.

3. A transaction coordinating system comprising:
   the transaction coordinating device as claimed in claim 2; and
   a terminal of a participant of said spot transaction connected to said transaction coordinating device via a communications circuit, wherein
   said spot transaction is conducted between said terminal operated by the participant of said spot transaction and said transaction coordinating device.

4. A transaction coordinating device as claimed in claim 1, further comprising:
   means for storing data associated with said transportation, wherein
   said insertion arrangement means arranges an insertion of a cargo transportation of said spot transaction based on data associated with conditions of said spot transaction transmitted from said sales data delivering means and said transportation transmitted from said transportation data storing means.

5. A transaction coordinating system comprising:
   the transaction coordinating device as claimed in claim 4; and
   a terminal of a participant of said spot transaction connected to said transaction coordinating device via a communications circuit, wherein
   said spot transaction is conducted between said terminal operated by the participant of said spot transaction and said transaction coordinating device.

6. A transaction coordinating device as claimed in claim 1, wherein:
   a commodity involved in said transaction comprises liquefied natural gas
   containers containing said liquefied natural gas transported on a sea or on a road are used in said transportation, and
   said cargo transportations are constrained by requirements of transporting liquefied natural gas.

7. A transaction coordinating device as claimed in claim 6 for coordinating an insertion of a cargo transportation of said spot transaction based on at least a predetermined number of days of operation and an actually required minimum number of days of operation of a freighter under navigation,
   wherein said predetermined number of days of operation is greater than or equal to said actually required minimum number of days of operation.

8. A transaction coordinating system comprising:
   the transaction coordinating device as claimed in claim 7; and
   a terminal of a participant of said spot transaction connected to said transaction coordinating device via a communications circuit, wherein
   said spot transaction is conducted between said terminal operated by the participant of said spot transaction and said transaction coordinating device.

9. A transaction coordinating system comprising:
   the transaction coordinating device as claimed in claim 6; and
   a terminal of a participant of said spot transaction connected to said transaction coordinating device via a communications circuit, wherein
   said spot transaction is conducted between said terminal operated by the participant of said spot transaction and said transaction coordinating device.

10. A transaction coordinating device as claimed in claim 1, further comprising:
    a terminal of a participant of said spot transaction connected to said insertion arrangement means and said sales data delivering means via a communications circuit,
    wherein said spot transaction is conducted between said terminal operated by a participant of said spot transaction and said insertion arrangement means and said sales data delivering means of said transaction coordinating device.

11. A transaction coordinating system comprising:
    the transaction coordinating device as claimed in claim 1; and
    a terminal of a participant of said spot transaction connected to said transaction coordinating device via a communications circuit, wherein
    said spot transaction is conducted between said terminal operated by the participant of said spot transaction and said transaction coordinating device.

12. A method of coordinating transactions and delivering cargo associated with said coordinated transactions applicable at inserting a spot transaction based on a temporary contract being made without respect to a fixed transaction based on a contract of predetermined term, said spot transaction comprising a transaction based on a one-time sales contract or based on an intermittent supply contract which is completed in a few times, said fixed transaction comprising a long-term stable offtake contract of predetermined term in which transportation schedules can be confirmed at least about a year before,
    said method comprising:
    setting a first transportation schedule of cargo transportation relating to said fixed transaction, and, concurrently, storing data associated with transportation in advance;
    reading the data associated with said transportation in an event said spot transaction arises;
    arranging an insertion of cargo transportation relating to said spot transaction by adjusting said first transportation schedule based on the read data associated with said transportation;
    and loading, transporting, and delivering said cargo in accordance with said schedule,
    wherein an arrangement of insertion of cargo transportation of said spot transaction is conducted sequentially by:
    a first stage of arranging an insertion of cargo transportation of said spot transaction without changing said first transportation schedule if such insertion is not impossible;
    a second stage of arranging an insertion of cargo transportation of said spot transaction by changing said first transportation schedule, only in an event that the first stage arrangement is impossible;
    a third stage of arranging an insertion of cargo transportation of said spot transaction by changing a second transportation schedule within a certain range, only in an event that the first and second stage arrangements are impossible; and
    a fourth stage of arranging an insertion of cargo transportation of said spot transaction by changing said second transportation schedule within a range to which said certain range is expanded, only in an event that the first, second and third stage arrangements are impossible, said first transportation schedule comprising shipping dates, unload dates, minimum days of navigation, and scheduled days of navigation for one or more freighters, said first stage of insertion of cargo transportations comprising a first freighter in said first transportation schedule being allocated as an additional freighter and a remainder of freighters in said first transportation schedule being shifted sequentially to be allocated to an original purchaser of said first transportation schedule, said second stage of changing said first transportation schedule comprising changing one or more of a date when a freighter ships, a date when a freighter unloads, and a number of days a freighter is under navigation, said third stage of changing said second transportation schedule comprising one or more of moving a freighter from said second transportation schedule into said first transportation schedule and moving a freighter from said first transportation schedule into said second transportation schedule, an adjustment or change being impossible if said adjustment or change would result in a failure to comply with terms of a fixed transaction.

13. A transaction coordinating method as claimed in claim 12, wherein:

a commodity involved in said transaction comprises a liquefied natural gas, containers containing said liquefied natural gas transported on a sea or on a road are used in said transportation, and said cargo transportations are constrained by requirements of transporting liquefied natural gas.

14. A transaction coordinating method as claimed in claim 13 for adjusting an insertion of cargo transportation of said spot transaction based on at least a predetermined number of days of operation and an actually required minimum number of days of operation of a freighter under navigation, wherein said predetermined number of days of operation is greater than or equal to said actually required minimum number of days of operation.

15. A method of coordinating transactions and delivering cargo associated with said coordinated transactions applicable at inserting a spot transaction based on a temporary contract made without respect to a fixed transaction based on a contract of predetermined term, said spot transaction comprising a transaction based on a one-time sales contract or based on an intermittent supply contract which is completed in a few times, said fixed transaction comprising a long-term stable offtake contract of predetermined term in which transportation schedules can be confirmed at least about a year before, said method comprising:

setting, in advance, a schedule of commodity transportation relating to said fixed transaction and storing data associated with transportation;

when a party on one side of said spot transaction inputs delivery conditions relating to said spot transaction with respect to a party on the other side of said spot transaction, reading data associated with said transportation and conditions of said spot transaction in an event that said spot transaction is organized based on delivery conditions of said spot transaction;

arranging an insertion of cargo transportation of said spot transaction by adjusting the schedule of commodity transportation of said fixed transaction, based on the read data associated with said transportation and the conditions of said spot transaction;

and loading, transporting, and delivering said cargo in accordance with said schedule, wherein an arrangement of insertion of cargo transportation of said spot transaction is conducted sequentially by:

a first stage of arranging an insertion of cargo transportation of said spot transaction without changing said transportation schedule if such insertion is not impossible;

a second stage of arranging an insertion of cargo transportation of said spot transaction by changing said transportation schedule, only in an event that the first stage arrangement is impossible:

a third stage of arranging an insertion of cargo transportation of said spot transaction by changing another transportation schedule within a certain range, only in an event that the first and stage arrangements are impossible; and a fourth stage of arranging an insertion of cargo transportation of said spot transaction by changing another transportation schedule within a range to which said certain range is expanded, only in an event that the first, second and third stage arrangements are impossible, said first transportation schedule comprising shipping dates, unload dates, minimum days of navigation, and scheduled days of navigation for one or more freighters, said first stage of insertion of cargo transportations comprising a first freighter in said first transportation schedule being allocated as an additional freighter and a remainder of freighters in said first transportation schedule being shifted sequentially to be allocated to an original purchaser of said first transportation schedule, said second stage of changing said first transportation schedule comprising changing one or more of a date when a freighter ships, a date when a freighter unloads, and a number of days a freighter is under navigation, said third stage of changing said second transportation schedule comprising one or more of moving a freighter from said second transportation schedule into said first transportation schedule and moving a freighter from said first transportation schedule into said second transportation schedule, an adjustment or change being impossible if said adjustment or change would result in a failure to comply with terms of a fixed transaction.

16. A computer-readable medium on which is stored a program of instructions which when executed by a digital device causes an inserting of a spot transaction based on a temporary contract, said temporary contract being made without respect to a fixed transaction based on a contract of predetermined term, said spot transaction comprising a transaction based on a one-time sales contract or based on an intermittent supply contract which is completed in a few times, said fixed transaction comprising a long-term stable offtake contract of predetermined term in which transportation schedules can be confirmed at least about a year before, which program when executed by a digital device causes the enactment of the steps of:

reading previously stored data associated with transportation in an event that said spot transaction arises; and adjusting an insertion of cargo transaction relative to said spot transaction with respect to a schedule of cargo transportation relative to said fixed transaction of predetermined term, based on the read data associated with said transportation, said adjusting of cargo transportation comprising a first freighter in said schedule being allocated as an addition freighter and a remainder of freighters in said schedule being shifted sequentially to be allocated to an original purchaser of said schedule, wherein the program executes the adjustment of the insertion of cargo transportation of said spot transaction sequentially by:

a first step of adjusting the insertion of the cargo transportation of said spot transaction without changing said transportation schedule;

a second step of adjusting the insertion of the cargo transportation of said spot transaction by changing said transportation schedule, only in an event that the first step is impossible, said changing of said transportation schedule comprising changing one or more of a date when a freighter ships, a date when a freighter unloads, and a number of days a freighter is under navigation;

a third step of adjusting the insertion of the cargo transportation of said spot transaction by changing another transportation schedule within a certain range, only in an event that the second step is impossible, said changing of said another transportation schedule comprising one or more of moving a freighter from said another transportation schedule into said transportation schedule and schedule and moving a freighter from said transportation schedule into said another transportation schedule; and a fourth step of adjusting the insertion of the cargo transportation of said spot transaction by changing another transportation schedule within a range to which said certain range is expanded, only in an event that the third step is impossible, an adjustment or change being impossible if said adjustment or change would result in a failure to comply with terms of a fixed transaction.

17. A computer-readable recording medium on which is stored a program of instructions which when executed by a digital device causes an inserting of a spot transaction based on a temporary contract as claimed in claim 16, wherein a commodity of said transaction comprises a liquefied natural gas and containers containing said liquefied natural gas transported on a sea or on a road are used in said transportation, and said cargo transportations are constrained by requirements of transporting liquefied natural gas.

18. A computer-readable recording medium on which is stored a program of instructions which when executed by a digital device causes an inserting of a spot transaction based on a temporary contact as claimed in claim 17 for adjusting the insertion of cargo transportation of said spot transaction as based on at least a predetermined number of days of operation and an actually required minimum number of days of operation of a freighter under navigation, wherein said predetermined number of days of operation is greater than or equal to said actually required minimum number of days of operation.

19. A computer-readable medium on which is stored a computer a program which when executed by a digital device causes an inserting of a spot transaction based on a temporary contract, said temporary contract being made without respect to a fixed transaction based on a contract of predetermined term, said spot transaction comprising a transaction based on a one-time sales contract or based on an intermittent supply contract which is completed in a few times, said fixed transaction comprising a long-term stable offtake contract of predetermined term in which transportation schedules can be confirmed at least about a year before, which program when executed by a digital device thereby comprising:

means for reading previously stored data associated with transportation in an event that said spot transaction arises; and means for adjusting an insertion of cargo transportation relative to said spot transaction with respect to a previously set schedule of one or more of single and plural cargo transportation relative to said fixed transaction based on the read data associated with said transportation, said adjustment of cargo transportations comprising a first freighter in said previously set schedule being allocated as an additional freighter and a remainder of freighters in said previously set schedule being shifted sequentially to be allocated to an original purchaser of said first transportation schedule, wherein the program executes sequentially by:

first means for adjusting the insertion of a cargo transportation of said spot transaction without changing said transportation schedule;

second means for adjusting the insertion of a cargo transportation of said spot transaction by changing said transportation schedule, only in an event that the first means adjustment is impossible, said changing of said transportation schedule comprising changing one or more of a date when a freighter ships, a date when a freighter unloads, and a number of days a freighter is under navigation;

third means for adjusting an insertion of cargo transportation of said spot transaction by changing another transportation schedule within a certain range, only in an event that the second means adjustment is impossible, said changing of another transportation schedule comprising one or more of moving a freighter from said another transportation schedule into said transportation schedule and moving a freighter from said transportation schedule into said another transportation schedule; and fourth means for adjusting the insertion of a cargo transportation of said spot transaction by changing another transportation schedule within a range to which said certain range is expanded, only in an event that the third means adjustment is impossible, an adjustment or change being impossible if said adjustment or change would result in a failure to comply with terms of a fixed transaction.

20. A program product on which is stored an executable computer program as claimed in claim 19, wherein a commodity involved in said transaction comprises a liquefied natural gas and containers containing said liquefied natural gas transported on a sea or on a road are used in said transportation, and said cargo transportations are constrained by requirements of transporting liquefied natural gas.

21. A program product on which is stored an executable computer program as claimed in claim 20 for adjusting an insertion of cargo transportation of said spot transaction, wherein said adjusting is based on at least a predetermined number of days of operation and an actually required minimum number of days of operation of a freighter under navigation, wherein said predetermined number of days of operation is greater than or equal to said actually required minimum number of days of operation.

* * * * *